United States Patent

Enomoto

[11] Patent Number: 5,387,869
[45] Date of Patent: Feb. 7, 1995

[54] APPARATUS FOR MEASURING TRANSIENT ELECTRIC EARTH CURRENT TO PREDICT THE OCCURRENCE OF AN EARTHQUAKE

[75] Inventor: Yuji Enomoto, Tsukuba, Japan

[73] Assignee: Agency of Industrial Science & Technology, Ministry of International Trade & Industry, Tokyo, Japan

[21] Appl. No.: 996,104

[22] Filed: Dec. 23, 1992

[30] Foreign Application Priority Data

Dec. 26, 1991 [JP] Japan .................. 3-359647

[51] Int. Cl.$^6$ .......................... G01V 3/00; G01V 3/08
[52] U.S. Cl. ..................... 324/348; 324/72; 324/323; 324/344; 324/351; 340/601
[58] Field of Search .......... 324/323, 347–349, 324/351, 72

[56] References Cited

U.S. PATENT DOCUMENTS

| | | | |
|---|---|---|---|
| 2,787,758 | 4/1957 | Walstrom | 324/351 |
| 3,638,106 | 1/1972 | Cram | 324/351 |
| 4,612,506 | 9/1986 | Varotsos et al. | 324/348 |
| 4,837,582 | 6/1989 | Takahashi et al. | |
| 4,904,943 | 2/1990 | Takahashi | |

FOREIGN PATENT DOCUMENTS 0067924 12/1982 European Pat. Off. ............. 324/348

OTHER PUBLICATIONS

Tectonophysics, 188 (1991) 321–347, P. Varotsos & M. Lazaridou, "Latest Aspects of Earthquake Prediction in Greece . . . ".
Earthquakes, vol. 43, No. 2, (1990) pp. 287–290, Y. Fujinawa, "Ulf Underground Electric Field Variations as the Imminent . . . ".
Nature International Weekly Journal of Science, vol. 346, No. 6285, pp. 641–643, Aug. 16, 1990, Y. Enomoto & H. Hashimoto, "Emission of Charged Particles From . . . ".

*Primary Examiner*—Gerard R. Strecker
*Attorney, Agent, or Firm*—Oblon, Spivak, McClelland, Maier & Neustadt

[57] ABSTRACT

An apparatus for measuring transient earth current includes a detection electrode and a second electrode disposed beneath the surface of the earth in vertical alignment with one another at depths greater than those to which electromagnetic waves generated above the surface of the earth having commercial power line frequencies penetrate, such that the electrical resistance between the detection electrode and the second electrode is on the order of several tens of thousands of ohms, and a charge detector for detecting only high frequency components of a current flowing between the detection electrode and the second electrode. On the basis of these detected high frequency components, the likelihood of an occurance of an earthquake may be determined.

6 Claims, 6 Drawing Sheets

APPARATUS FOR MEASURING TRANSIENT ELECTRIC EARTH CURRENT TO PREDICT THE OCCURRENCE OF AN EARTHQUAKE

BACKGROUND OF THE INVENTION

1. Field of the Invention

This invention relates to an earth current detector for detecting transient earth currents that occur in advance of an earthquake or the like.

2. Description of Prior Art

Over the years there have been many reports of anomalous phenomena being observed prior to the occurrence of earthquakes: abrupt changes in earth currents (earth potential) and the electrical resistance of earth crust, luminous phenomenon, abnormal animal behavior, and earthquake clouds, to name a few.

In Greece, earthquake prediction based on the detection of earth currents is being conducted with a fairly high rate of success. According to the Greek method, a number of electrode-pairs are buried several meters under ground at locations separated East-West and North-South by several tens or several hundreds of kilometers, and the electrical potential between pairs of these electrodes is monitored. The signals obtained are passed through a 0.1 Hz low-pass filter, converted from analog to digital and transmitted in real time via telephone circuits to a central observation point, where they are recorded and displayed. The occurrence of an earthquake is predicted when a change in potential exceeds a prescribed level. (P. Varotsos and M. Lazaridou; Tectonophysics, 188 (1991) P321-347.)

In Japan, an attempt is being made to use a measurement electrode consisting of a buried 600 m casing pipe and a total of 140 m of electrically conductive wire arrayed around the pipe as a measurement electrode for detecting, as earthquake precursors, anomalies in three radio wave frequency bands: DC—0.7 Hz, 0.01–0.1 Hz and 1–9 kHz. (Yukio Fujinawa, Kozo Takahashi, Sadaharu Kumagaya, Earthquakes Vol. 43, No. 2 (1990) P287-290.)

U.S. Pat. No. 4,904,943 teaches an earthquake prediction method in which earth currents are simultaneously observed at four points, the detected signals are processed to determine the origin and intensity distribution of the earth currents, and the hypocenter region, scale, and time of occurrence of an earthquake are predicted from changes over time in the origin and intensity.

U.S. Pat. No. 4,837,582 teaches a method of detecting radio waves generated by a hypocenter region. When the method is used on land, a linear antenna is buried to a depth of at least 1,000 m and a radial antenna centered on the linear antenna is laid out on the earth's surface. When applied in the sea, an insulated electrically conductive cable is laid on the sea bottom at a depth of 200 m or more for use as an antenna. In either case, the occurrence of earthquakes is predicted on the basis of radio waves picked up by the antenna.

The Greek method of earthquake prediction mentioned earlier is also being tested in Japan, but with less success in an industrialized and populated region. This is thought to be because of differences in the intensity of man-made electrical noise near cities. Moreover, since the measurements in this method are affected by both natural phenomena such as rain and lightning and by artificial electrical noise, it is necessary to rely on human judgment in determining whether or not a detected signal is an indication of an impending earthquake.

The graph of FIG. 6 shows the results obtained when an electrode was buried to a depth of 2 m at each of two locations, a rock dynamiting site and a point about 70 m away from the site, and the earth current between the two points was measured at the time rock was dynamited. As shown in FIG. 6(b), the explosion occurred about 23 seconds after the start of the measurement. As can be seen from FIG. 6(a), the earth current produced by the explosion could not be detected because it was masked by an interfering noise signal produced by commercial power line current frequency electromagnetic waves.

As will be understood from the foregoing, methods involving the measurement of the potential difference, electric current, or the resistance between two surface points have the drawback of being affected by unpredictable factors such as changes in the weather (e.g. rain and lightning) and man-made electromagnetic noise. Conditions thus vary from one measurement region to another. This means that different observers may, depending on their experience, come to different conclusions regarding whether a particular signal is caused by one of these disturbances or is a sign of an impending earthquake. Moreover, since the measurement instruments have their results of measurement recorded by a pen recorder, their sensitivity to fracture-induced current and other such rapidly fluctuating signals is low. In view of this situation, there is a need for an earth current detection method that is not affected by the climate and human activity in the region being monitored and is not dependent on the judgment of the observer.

In addition, when the aforesaid method of predicting earthquakes on the basis of low-frequency band electromagnetic waves is used in urban areas where the level of artificial electromagnetic noise is high, the effect of the noise has to be reduced by conducting the measurement at great depth underground because the electromagnetic disturbance from the man-made noise penetrates the ground to a considerable depth. Moreover, the need to use a large antenna for picking up the low-frequency electromagnetic waves results in high equipment costs.

Where earthquake detection is conducted on the basis of underground radio waves received by an antenna extending to a depth of 1,000 m or more below the ground surface as taught by the earlier mentioned U.S. patent, the cost of installing the antenna becomes prohibitively high at sites other than at abandoned mines and wells. The points at which measurement can be conducted are thus severely limited.

SUMMARY OF THE INVENTION

This invention was accomplished in light of the foregoing circumstances and has as one of its objects to provide an earth current detector which enables earth currents to be detected substantially unaffected by the climate or human activities in the region being monitored, is not highly dependent on human judgment, and, as such, is capable of simple and reliable earth current detection even in urban areas.

For achieving this object, the invention provides an earth current detector comprising a detection electrode disposed in the ground at a depth deeper than that to which commercial power line frequency electromagnetic waves produced on the Earth's surface penetrate, a second electrode installed such that the electrical resistance between itself and the detection electrode amounts to more than several tens of thousands of ohms, and a charge detector for detecting only the high-frequency components of the earth current flowing between the two electrodes.

When a fracture indicative of an impending earthquake occurs at some part of the Earth's crust, the earth current that is produced and propagated through the ground owing to the radiation of fracture-induced electric charges is detected by the detection electrode. Since the detection electrode is located at a depth below that reached by surface electromagnetic waves, the detected signal includes hardly any noise. A signal representing the detected earth current is sent to the charge detector, which is constituted by a preamplifier and a main amplifier. The preamplifier blocks signals that fluctuate slowly and converts to a voltage signal only the high-frequency components, which are not very susceptible to the effect of manmade noise. The main amplifier divides the voltage signal resulting from the conversion at prescribed time intervals and amplifies and integrates the divided signals for judging whether or not a fracture in the Earth's crust has occurred. It is therefore possible to detect earth currents resulting from crust fractures with high reliability. Moreover, since the two electrodes can be installed as separated vertically from each other, the effect of man-made electromagnetic noise and differences in geology is minimal. In addition, the strength of current propagated through rock is inversely proportional to the distance between the point of rock fracture (the hypocenter) and the measurement point, and is approximately proportional to the size of the hypocenter. (See P. Varotsos and M. Lazaridou; Tectonophysics, 188 (1991) P321-347.) By taking measurements at a number of points it is therefore possible to identify the location of the epicenter.

The above and other features of the present invention will become apparent from the following description made with reference to the accompanying drawings.

BRIEF DESCRIPTION OF THE DRAWINGS

FIG. 3(c) is an explanatory view showing how the current propagation of FIG. 3(a) and FIG. 3(b) is measured.

DESCRIPTION OF THE PREFERRED EMBODIMENTS

This invention has been accomplished on the basis of the results of an experiment in which it was detected that electric charge radiation occurring during the progress of small-scale explosion of rock propagated within the rock as a rapidly fluctuating transient current signal [Y. Enomoto & H. Hashimoto, "Nature" Vol 346, No. 6285 (1990) pp. 641-643].

Differing from a prior art method for the detection of low-frequency signals, the research made in the aforementioned paper is characterized by picking up the electric charge fluctuation of high-frequency components (not less than 1 MHz as virtual effective value). At the site of explosion of the rock dynamited as described above, an attempt was made to detect a transient current signal at a depth of about 2 m from the ground surface. As a result, it was impossible to pick up the transient current signal that would be produced by the rock explosion. The reason for this was that the transient current signal was included in a noise signal resulting from the interference with commercial power line frequency.

Figure 1:
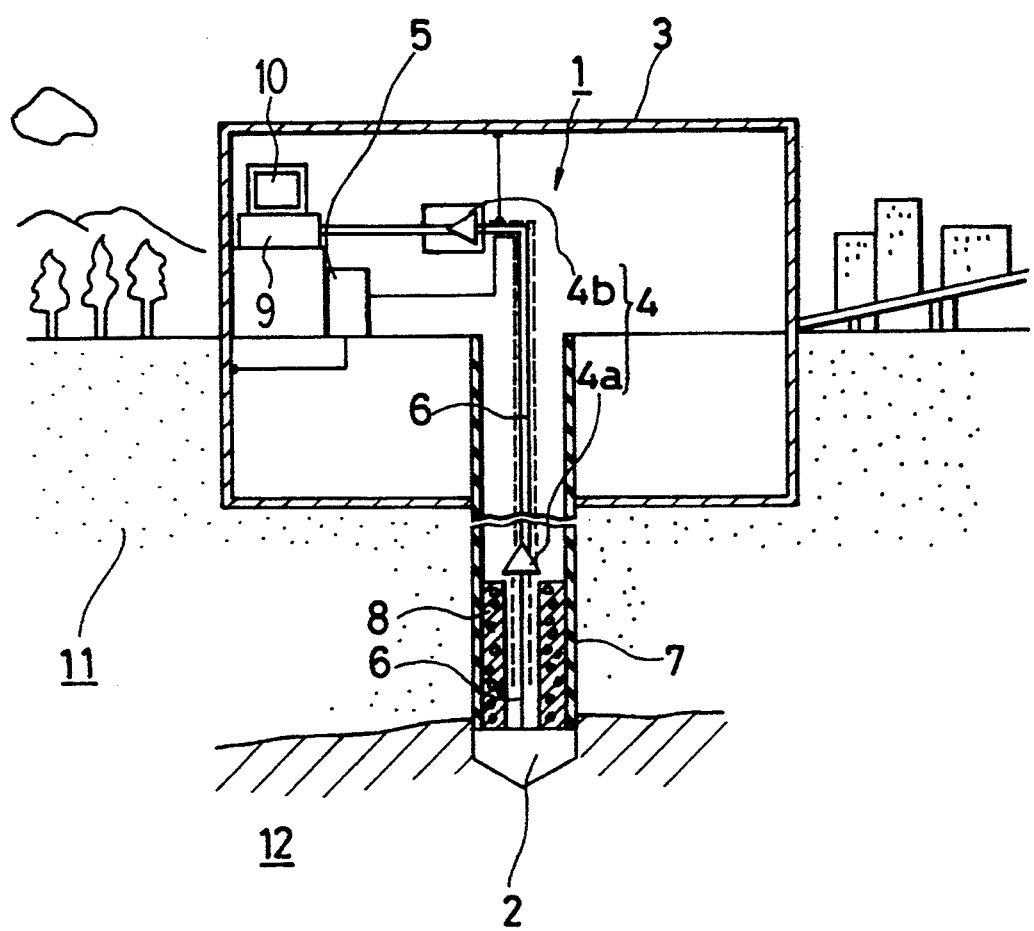
FIG. 1 is a schematic view showing the configuration of an embodiment of the earth current detector according to the invention.

In FIG. 1, reference numeral 1 designates an earth current detector according to an embodiment of the present invention. The earth current detector 1 comprises a detection electrode 2 buried in the ground at a depth (skin depth) deeper than that reached by commercial power line frequency electromagnetic waves, a charge detector 4 constituted by a preamplifier 4a installed in an insulating pipe 7 which protrudes from a magnetically shielded room 3 and a main amplifier 4b installed within the magnetically shielded room 3, and a second electrode 5 separated vertically from the detection electrode 2. The detection electrode 2 is made of a corrosion-resistant electrically conductive material. For enabling it to effectively detect rapid charge fluctuations radiated at the time of rock fracture, it is installed at a ground stratum 11 or rock bed 12 that is at a depth (the sub-surface depth) deeper than the maximum depth reached by radio waves of a commercial power line frequency of 50 or 60 Hz in Japan or higher that are present in the atmosphere or at the surface of the Earth. When propagated current is mainly detected, for example, the skin depth z at which the detection electrode 2 is installed is given by $$z = 500 \sqrt{\rho/f}$$

where $\rho$ is the resistivity of the ground and f is the frequency of the radio waves apt to interfere with the measurement.

Therefore, if the resistivity $\rho$ of the wet ground is 50 $\Omega$·m, the maximum depth reached by the aforesaid 50 Hz and higher frequency radio waves is found from this equation to be 500 m or more. Ground containing a lot of ground water may have a low resistivity of, say, 0.5 $\Omega$·m, in which case the maximum depth reached by the 50 Hz and higher frequency radio waves is 50 m or more. On the other hand, the skin depth of a 1 Hz electromagnetic field is about 3,500 m at a ground resistivity of 50 $\Omega$·m and about 350 m at a ground resistivity of 0.5 $\Omega$·m.

It is therefore preferable to select as the signal to be detected the highest frequency component charge signal possible, because this enables the detection electrode to be installed at a shallower depth, which is economical, and also limits the noise sources, making them easier to avoid.

The humidity and temperature of the electromagnetically shielded room 3 have to be maintained constant so as to avoid their affecting the measurement. For avoiding radio wave noise, the magnetically shielded room 3 is constructed of metal material with high electrical conductivity and is grounded to keep it at the same electrical potential as the surrounding ground surface.

The insulating pipe 7 buried under the electromagnetically shielded room 3 is made of a good insulating material such as vinyl chloride. Its upper end opens into the electromagnetically shielded room 3 and its lower end has the detection electrode 2 mounted thereon. To counteract the buoyancy of ground water on the insulating pipe 7 and to prevent water from getting into the pipe through the joint between it and the detection electrode 2, the lower portion of the pipe is filled with an insulating material 8 such as alumina cement, pebbles, or an epoxy type bonding agent.

The second electrode 5 provides a reference potential (substantially zero). Since the electrical resistance between it and the detection electrode 2 need only be 10 KΩ or greater, the second electrode 5 can be vertically separated from the detection electrode 2. As it is preferably located at a place where it is little affected by man-made noise, in the present embodiment it is installed inside the magnetically shielded room 3.

The preamplifier 4a mounted inside the insulating pipe 7 is designed to block slowly varying frequency components below a prescribed predetermined level in view of the depth at which the detection electrode is installed, the resistance of the ground, etc., and converts only the rapidly varying charge signal components to a voltage signal which it then amplifies. The main amplifier 4b, which is designed to have an effective sensitivity to frequencies of 100 kHz or more, divides the voltage signal received from the preamplifier 4a at prescribed time intervals and then amplifies the signal segments. Main amplifier 4b may be exempliefied by an amplifier comercially available as product code number CFE-500 by COMTEC, Inc., however any equivalent amplifier comprising means for sampling an input signal at prescribed time intervals and amplifying the sampled signal may be implemented as main amplifier 4b without departing from the scope of the present invention.

The main amplifier 4b and the detection electrode 2 are connected via the preamplifier 4a in the insulating pipe 7 by a lead line 6. The lead line 6 in the insulating pipe 7 is a coaxial cable whose center wire interconnects the detection electrode 2 and the charge detector 4 and whose outer shielding is connected with the second electrode 5 so as to be maintained at zero potential. The ground side of the main amplifier 4b is connected to the magnetically shielded room 3 so as to maintain an equipotential therebetween.

The second electrode 5 is directly connected to the ground side of the charge detector 4. The equivalent circuit of the detection system constituted by the two electrodes and the charge detector is thus isolated from external electromagnetic and climatic disturbances. Since low-frequency signals are effectively shut out by the circuitry and only the high-frequency components of electrical noise are allowed to pass through the charge detector due to oxidation-reduction reaction at the electrode surface, any artificial electric signal is minimized. It becomes, therefore, possible to measure minute earth currents at a high signal-to-noise ratio.

The signal from the charge detector 4 is integrated by a computer 9 and stored in memory in a computer 9 and, if required, displayed on a display 10 and transmitted to a central observatory.

Figure 2:
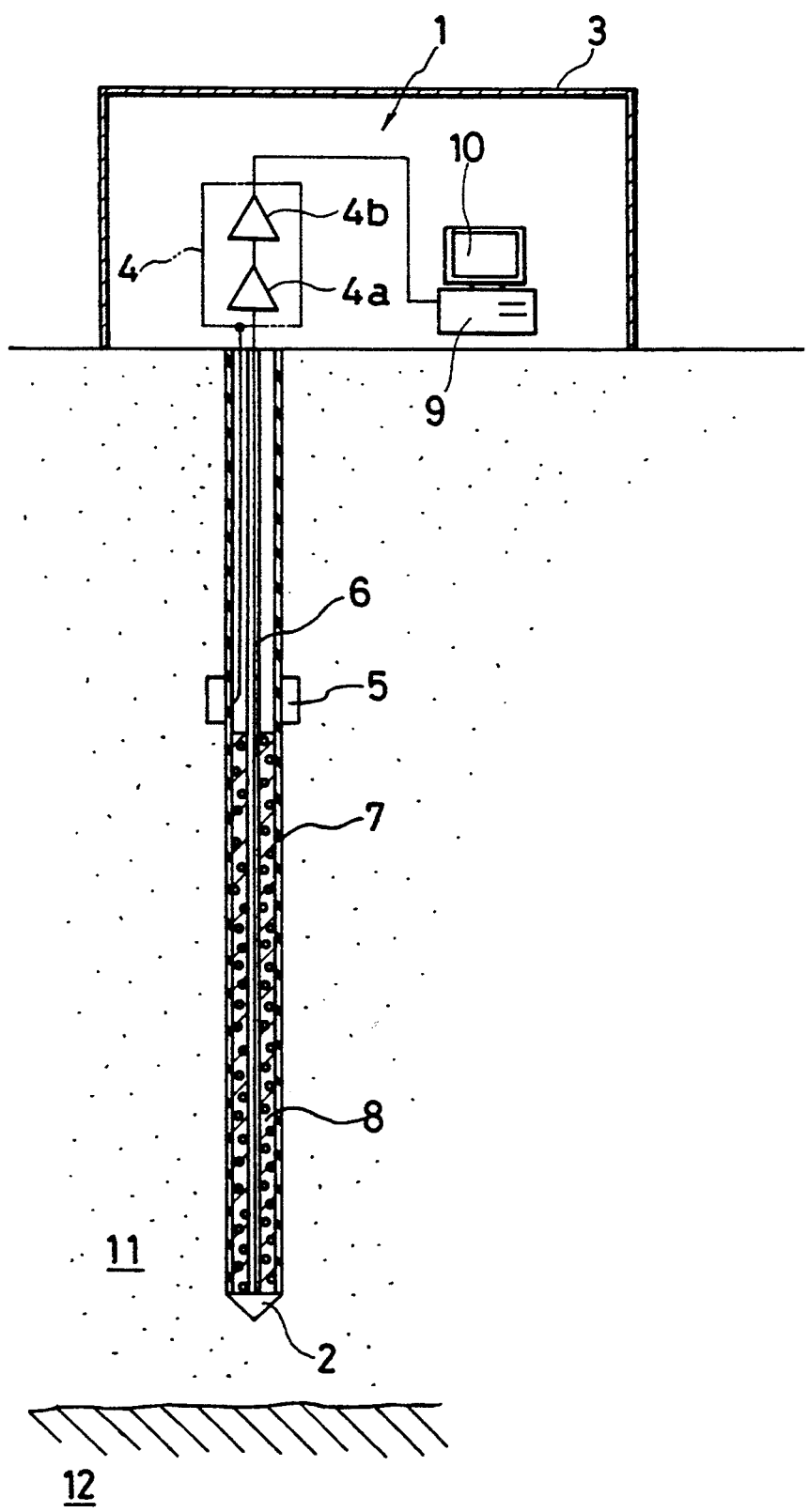
FIG. 2 is a schematic view showing the configuration of another embodiment of the earth current detector according to the invention.

FIG. 2 schematically illustrates another simple embodiment of the earth current detector 1 according to the present invention. In this embodiment, the second electrode 5 is installed at an intermediate point on the insulating pipe 7 which extends into the ground and has the detection electrode 2 mounted at its distal end. The second electrode 5 is positioned deeper than the aforementioned electromagnetic field sub-surface attenuation depth and establishes a resistance between itself and the detection electrode 2 of at least several tens of thousands of ohms. Specifically, where the commercial power line frequency is 50 Hz and the ground contains ground water, the detection electrode is sunk to about 100–150 m and the second electrode to about 60 m directly above the detection electrode. The installation of both the second electrode 5 and the detection electrode 2 at a depth greater than that reached by surface radio waves has a marked noise elimination effect. The preamplifier 4a and main amplifier 4b constituting the charge detector 4 are installed within the magnetically shielded room 3.

Detection of ground currents with the earth current detector 1 configured in this manner will now be explained. Ground currents generated owing to the fracture-induced charge emission occurring at the time of rock fractures at the epicenter pass through the rock bed 12 and the ground stratum 11 and enter the detection electrode 2. The current signal entering the detection electrode 2 passes to the preamplifier 4a through the lead line 6, where only its high-frequency components are converted to a voltage signal that is sent to the main amplifier 4b. At the main amplifier 4b the voltage signal is divided at prescribed time intervals and amplified, whereafter it is sent to the computer 9 for processing, storage in memory and, if required, display on the display 10 and transmission via a telephone circuit or the like to an observatory located outside of the shielded room.

When an abnormal signal has been detected by an earth current detector according to the invention, the judgment as to whether the signal is the result of fissuring of the Earth's crust that portends an earthquake or of local man-made noise can be made easily and reliably by referring to the signals detected at a plurality of observation points.

In addition, the strength of current propagated through rock is inversely proportional to the distance between the point of rock fracture (the epicenter) and the measurement point, and is proportional to the size of the hypocenter. By taking measurements at a number of points it is therefore possible to identify the location of the rock bed fracture.

Figure 3A:
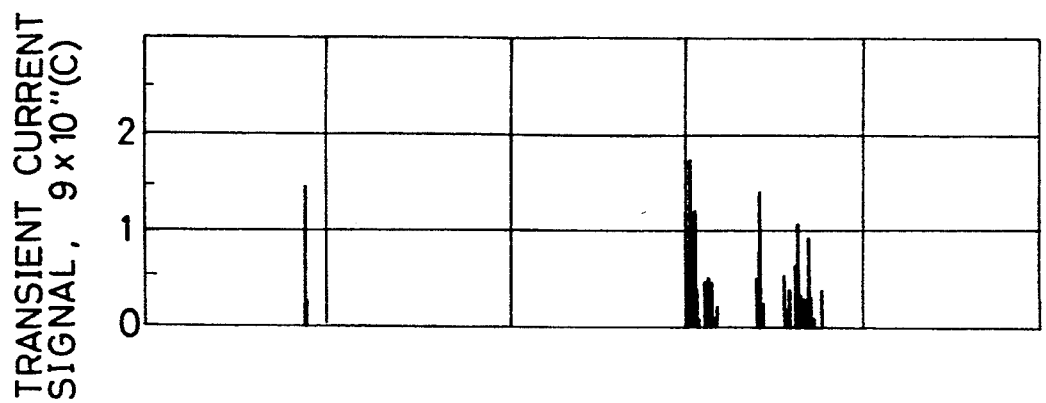
FIGS. 3(a) and 3(b) are graphs showing current propagation through granite.
Figure 3B:
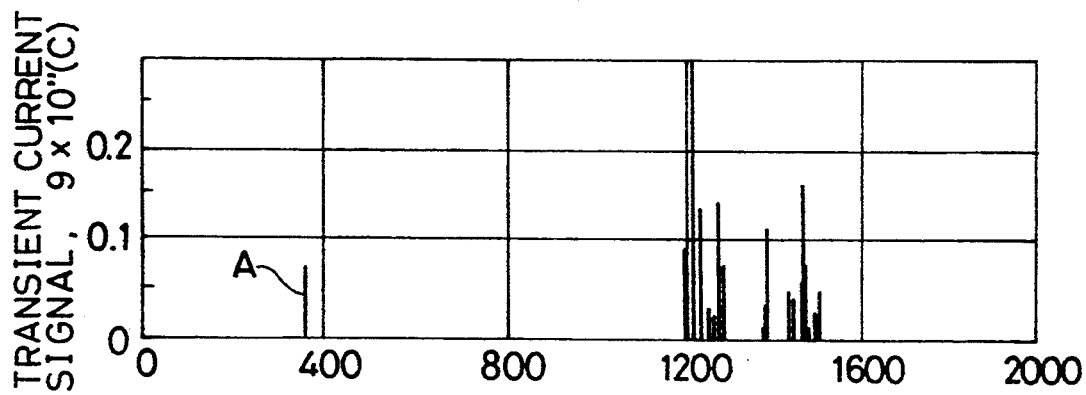
Figure 3C:
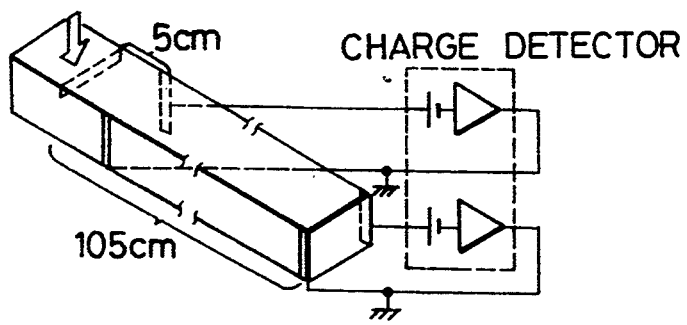

The results of a test conducted for confirming that the strength of an earth current propagating through rock is inversely proportional to the distance between the rock fracture point and the measurement point are shown in FIG. 3(a) and (b). One electrode was positioned 5 cm and another 105 cm from the portion of a 30 (w)×30 (h)×110 (l) cm granite slab to be fractured in the test (FIG. 3(c)). The slab was fractured by using a press to apply pressure to a chisel set at the intended fracture point. The current detected 5 cm from the fracture point is shown in FIG. 3(a) and that detected 100 cm from the fracture point is shown in FIG. 3(b). It will be noted that the electrode located further from the fracture point was also able to detect the current with no trouble.

Figure 4:
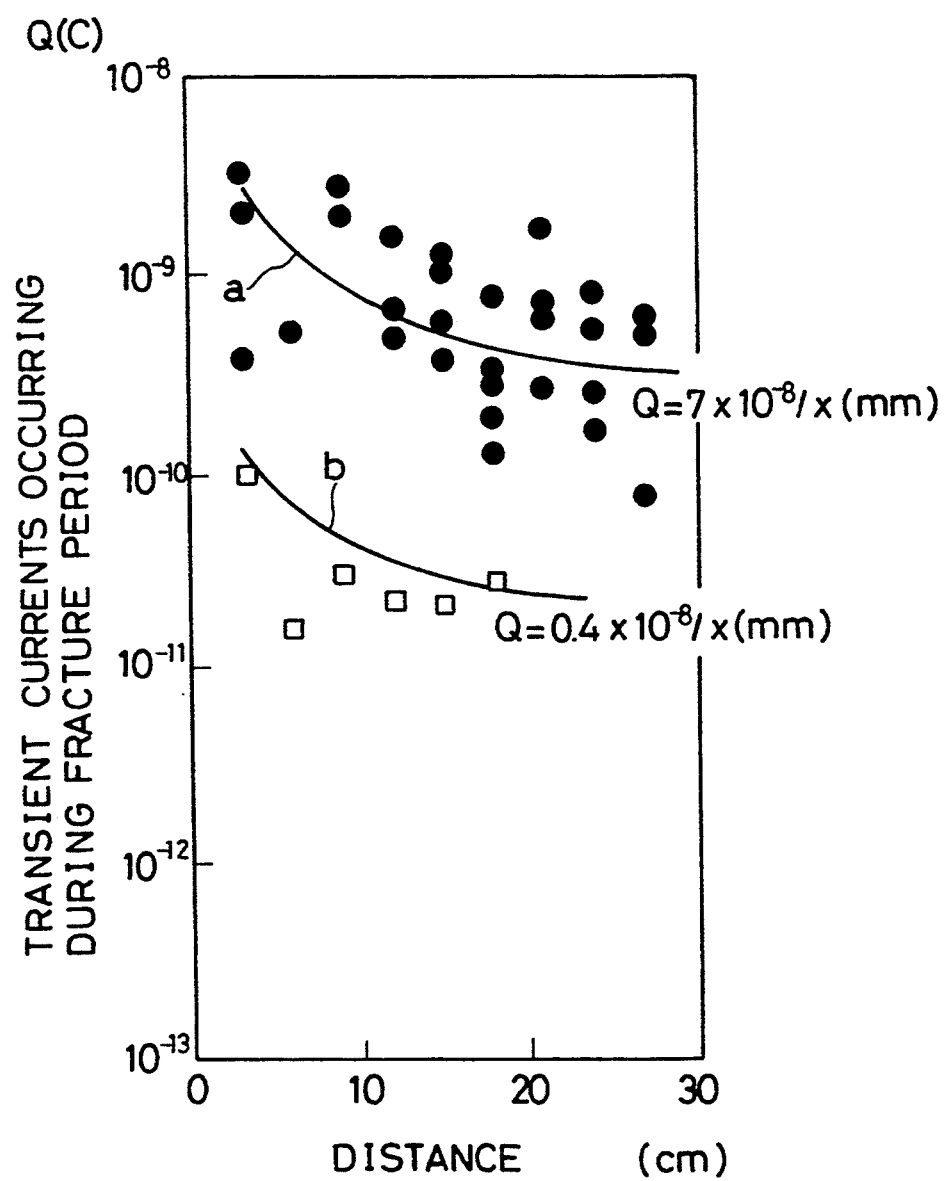
FIG. 4 is a graph showing how the strength of current flowing through granite varies in inverse proportion to the distance of the measurement point from the source.

In another test, an electrode was attached to one end of each of two 2 (w)×2 (h)×30 (1) cm square bars of different kinds of granite (coarse grain and fine grain) and the currents produced in the square bars when they were fractured near one end were measured. The results are shown in FIG. 4.

The results for a coarse-grain granite bar can be approximated by curve (a), which corresponds to $Q=7\times 10^{-8}/x$ (mm) wherein x is the distance between the fracture point and the detecting electrode. The results for a fine-grain granite bar can be approximated by curve (b/), which corresponds to $Q=0.4\times 10^{-8}/x$ (mm). In either case, the signal strength is inversely proportional to the distance x between the fracture point and the measurement point.

Figure 5A:
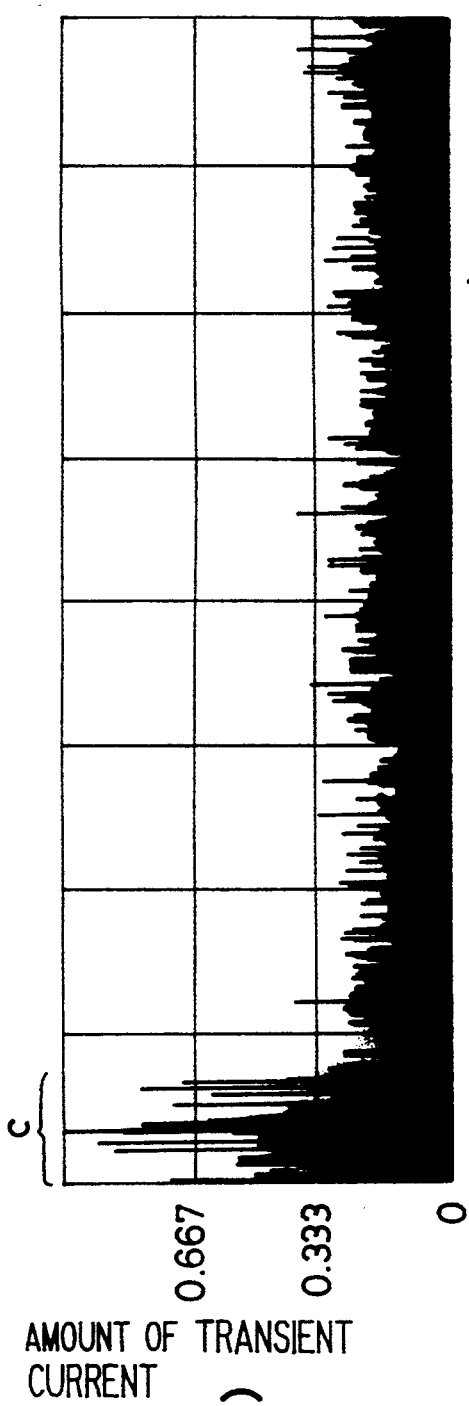
FIG. 5(a) is a graph showing earth current measured with a detector according to the invention.
Figure 5B:
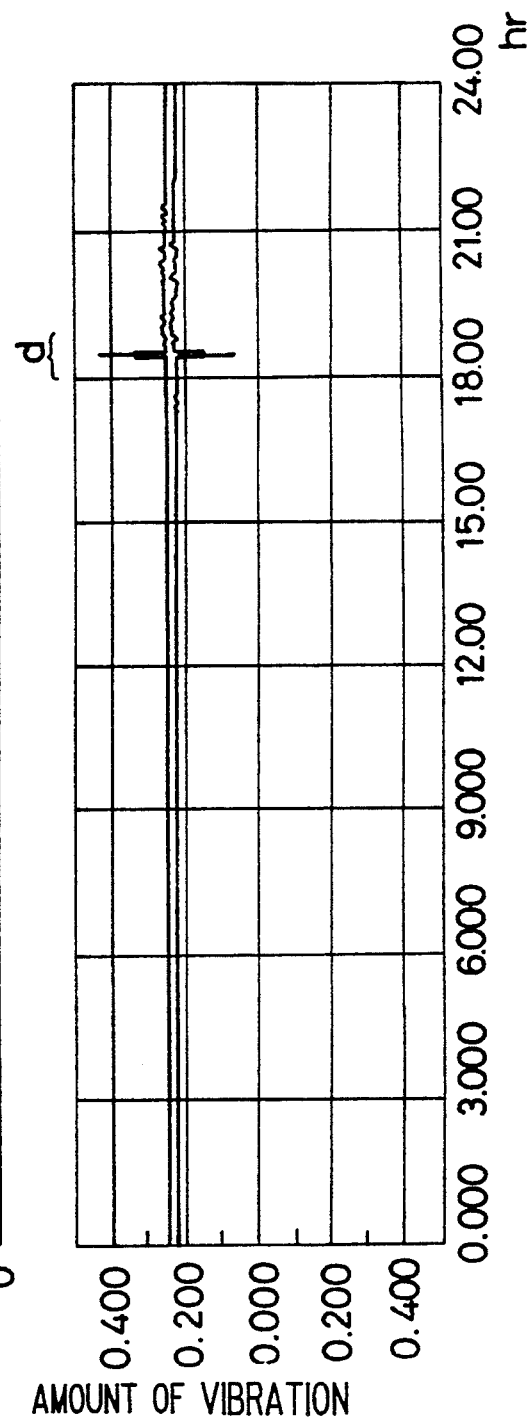
FIG. 5(b) is a graph showing the amount of vibration detected by a seismograph over the same time period as that in FIG. 5(a).
Figure 6A:
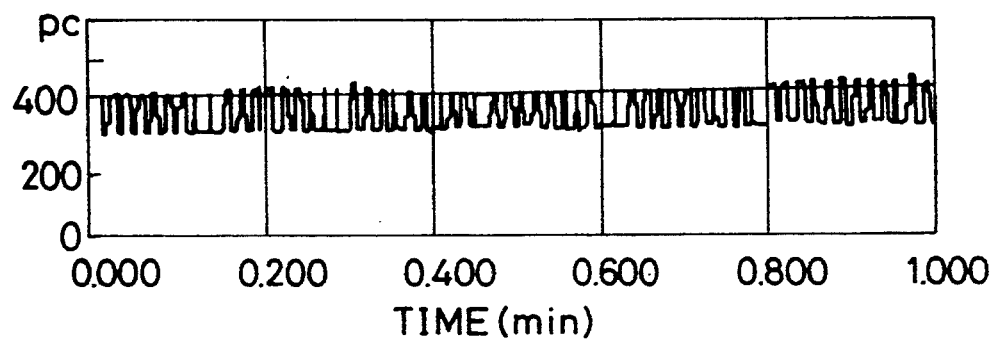
FIG. 6(a) is a graph showing earth current propagated near the Earth's surface.
Figure 6B:
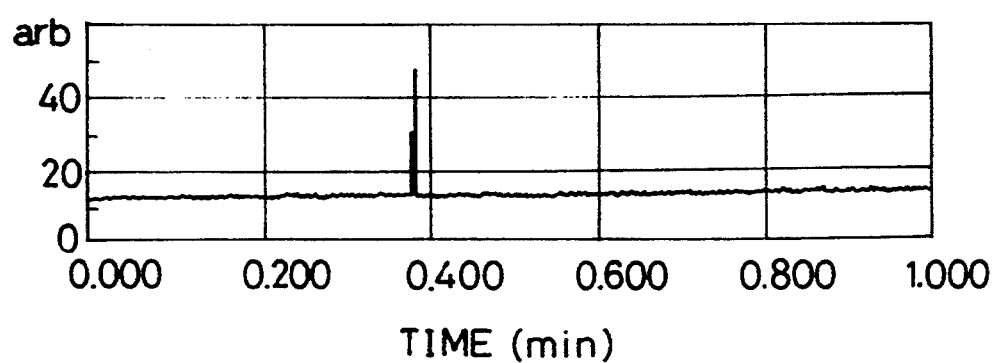
FIG. 6(b) is a graph showing the amount of vibration detected by a seismograph.

FIG. 5(a) shows the results obtained by integrating an earth current signal detected on Aug. 27, 1992, using an earth current detector according to FIG. 2 in which the detection electrode was installed at a depth of 65 m and the second electrode at a depth of 6 m, in ground containing ground water. FIG. 5(b) shows the signal output by a seismograph over the same time period. The skin depth with respect to 50 Hz radio waves at the test location was about 50 m.

As will be noted at the extreme left of the graph of FIG. 5(a), a high-strength transient current was observed over a period of about two hours (the period marked (c)). About 18 hours later, an earthquake with a magnitude of 4.8 occurred at a distance of about 10 km from the point where the transient current was measured. The epicenter was 50 km beneath the surface. The signal output by a seismograph at this time is marked (d) in FIG. 5(b).

As is clear from FIG. 5(a), the earth current detector according to this invention was able to selectively detect the earth current produced at the time that a fracture of the Earth's crust signifying an impending earthquake occurred. This evidences the invention's utility in reliable earthquake prediction.

As explained in the foregoing, the earth current detector according to the invention enables "single-site" measurement utilizing an electrode buried in the ground at a depth where it is little affected by electromagnetic waves present at the Earth's surface. It is therefore substantially immune to man-made surface noise, variation in geological conditions between two points, and the like. In addition, since the charge detector selects and amplifies only the high-frequency components, it suffices to install the electrode at a shallow depth, which is advantageous from the point of cost and achieving high measurement sensitivity. As a result, the earth current detector according to the invention can be used with good results even in cities and other areas where there is a high level of man-made electromagnetic disturbance. That is to say, it is able to suppress the effect of man-made electromagnetic disturbance and measure minute earth currents at a high signal-to-noise ratio.

Moreover, once a sufficient amount of data has been accrued regarding the relationship between earth current signals and the occurrence of earthquakes, the earth current detector according to the invention will be useful in earthquake prediction. It also has the capability of enabling determination of earthquake epicenters when a number of the detectors are installed at different points.

What is claimed is:

1. An apparatus for measuring transient earth current to predict the occurrence of an earthquake, comprising:
   a detection electrode disposed beneath an earth surface at a depth greater than that to which electromagnetic waves generated above said earth surface having commercial power line frequencies penetrate;
   a second electrode disposed beneath said earth surface such that an electrical resistance formed between said detection electrode and said second electrode is on the order of several tens of thousands of ohms, said second electrode providing a reference potential; and
   a charge detector coupled to said detection electrode and to said second electrode, said charge detector including a preamplifier and a main amplifier, said preamplifier detecting components having frequencies of at least 100 kHz of a current flowing between said detection electrode and said second electrode, converting said components into a voltage signal, amplifying said voltage signal to produce an amplified signal, and supplying said amplified signal to said main amplifier, said main amplifier sampling said amplified signal at prescribed time intervals to produce a sampled signal and amplifying said sampled signal.

2. An apparatus according to claim 1, wherein said second electrode is disposed in vertical alignment with said detection electrode at a depth shallower than said detection electrode.

3. An apparatus according to claim 2, wherein said second electrode is disposed beneath said earth surface at a depth greater than that to which electromagnetic waves generated above said earth surface having commercial power line frequencies penetrate.

4. An apparatus according to claim 1, wherein said charge detector comprises a preamplifier connected in series to a main amplifier.

5. An apparatus according to claim 4, wherein said preamplifier blocks components of said current having frequencies lower than 100 kHz and passes only components of said current having frequencies of at least 100 kHz.

6. An apparatus according to claim 1, wherein said second electrode is disposed within a magnetically shielded space.

* * * * *